No. 873,210. PATENTED DEC. 10, 1907.
J. R. CARDWELL.
FRICTION DRAFT GEAR.
APPLICATION FILED APR. 24, 1905.
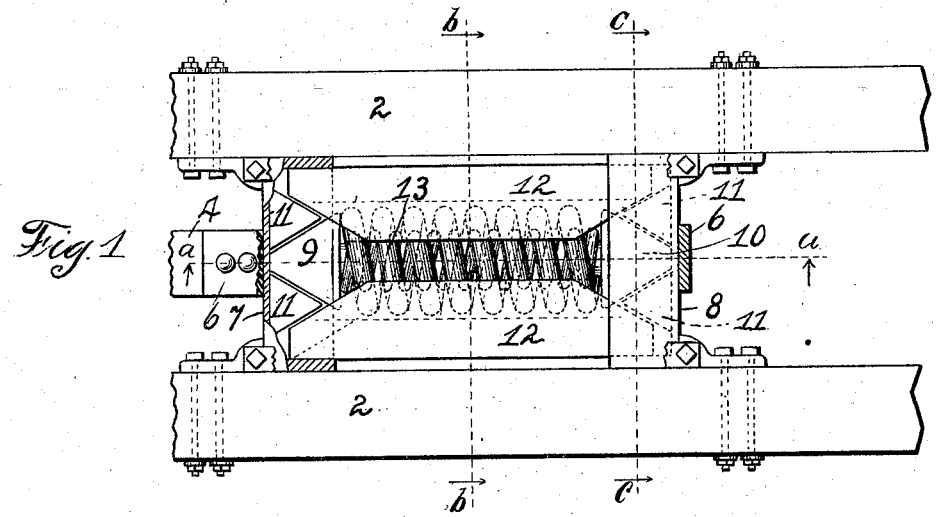
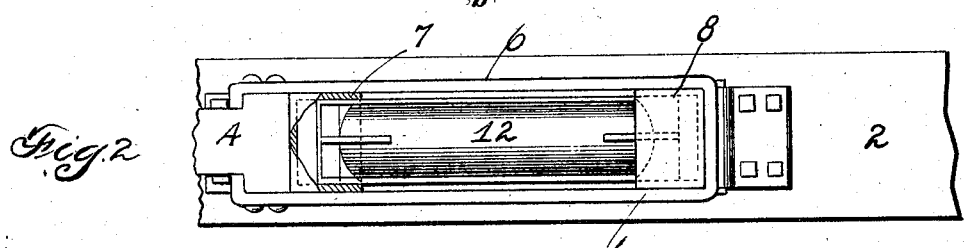
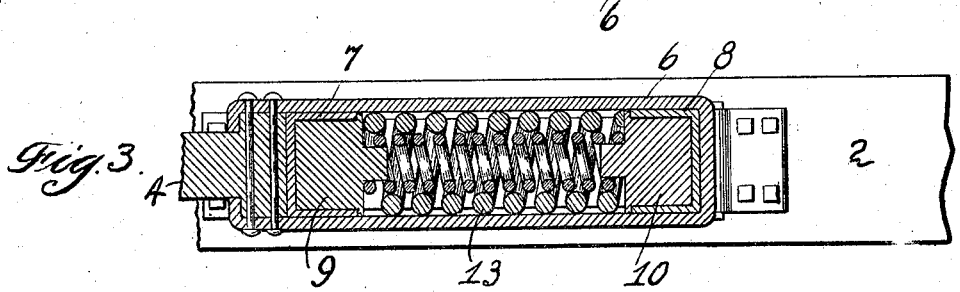
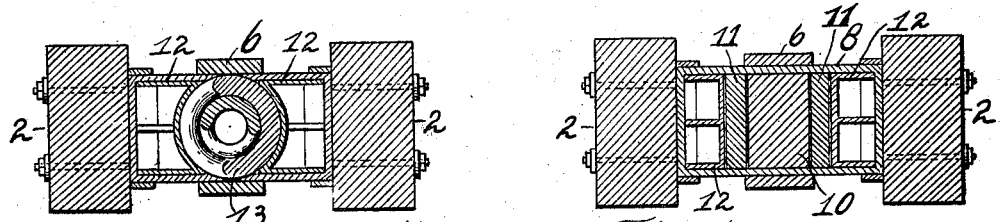
Witnesses
Chas. F. Bassett
Leon Stroh
Inventor
James R. Cardwell
By G. L. Cragg
Atty.

UNITED STATES PATENT OFFICE.

JAMES R. CARDWELL, OF CHICAGO, ILLINOIS.

FRICTION DRAFT-GEAR.

No. 873,210.

Specification of Letters Patent.

Patented Dec. 10, 1907.

Application filed April 24, 1905. Serial No. 257,181.

*To all whom it may concern:*

Be it known that I, JAMES R. CARDWELL, citizen of the United States, residing at Chicago, in the county of Cook and State of Illinois, have invented a certain new and useful Improvement in Friction Draft - Gear, of which the following is a full, clear, concise, and exact description, reference being had to the accompanying drawings, forming a part of this specification.

My invention relates to friction draft gear for use in railway train service, and has for its main object the provision of improved means whereby when the coupler of each gear is pulled or pushed, friction is created simultaneously at both ends of the friction portion of the gear.

Another object of the invention is to so construct the friction mechanism of the gear that the sides of the coupler yoke encompassing the friction elements need not be separated more than the standard distance established by the Master Car Builders' Association, namely six and one-half (6½) inches. This feature of my invention enables me to dispose the spring mechanism of the gear longitudinally of the draft sills, though I do not wish to be limited in all embodiments of my invention to such disposition of the spring. I also do not wish to be limited in all embodiments of the invention wherein the friction on each movement of the coupler is simultaneously had at both ends of the gear.

In the preferred embodiment of the invention the ends of the friction mechanism where the friction desirably simultaneously occurs upon each movement of the coupler, are located one ahead of the other lengthwise of the car, though I do not wish to be limited to this disposition in all embodiments of the invention.

In the preferred embodiment of my invention I employ pocketed follower plates, one at each end of the friction mechanism and encompassed by the coupler yoke, one pocketed follower plate being at one end of the coupler yoke and the other at the other end of the yoke, the pockets of said follower plates containing and supporting triangular friction blocks which are preferably loose or floating, which structural feature is another part of my present invention. There is desirably provided in the pocket of each follower plate a centrally disposed triangular friction block element flanked on each side by a loose or floating friction block. Each of these lateral floating friction blocks, in turn, is flanked by outside friction blocks or members that are movable with respect to the follower plates and which preferably project into the pockets thereof. Spring mechanism is interposed between the central triangular friction blocks carried in the pockets of the follower plates, which spring mechanism may, by means of my invention, fully or almost fully occupy the space between the longitudinal stretches of the coupler yoke without impairing the efficiency of the lateral friction members of the gear that extend between the follower plates, for these friction members may be scalloped at their inner longitudinal and opposing faces substantially to conform to the shape of the spring mechanism. By this construction the vertical thickness or depth of these lateral friction members may substantially equal the distance between the inner opposed faces of the longitudinal sides of the coupler yoke.

I will more fully set forth the characteristics of my invention and the preferred embodiment thereof by reference to the accompanying drawing, in which—

Figure 1 is a plan view illustrating so much of a car frame as is necessary to an understanding of the invention, the preferred form of the invention being shown in association therewith. Fig. 2 is a view in elevation of the structure, a portion of the follower plates being broken away. Fig. 3 is a longitudinal sectional elevation on line *a—a* of Fig. 1. Fig. 4 is a view in cross-section on line *b—b* of Fig. 1. Fig. 5 is a view in cross-section on line *c—c* of Fig. 1.

Like parts are indicated by similar characters of reference throughout the different figures.

Portions of draft sills 2—2 are shown, the disposition and construction of these sills being suited to the make of the car. A forward pocketed follower plate 7 abuts against the coupler shank 4 while a rear pocketed follower plate 8 abuts against the rear end of the coupler yoke 6. Centrally disposed triangular or wedging friction elements 9— 10 are carried within the pockets of the fol lower plates. These wedging elements 9—10 are desirably movable longitudinally of the coupler yoke and are flanked by floating or movable triangular or wedge blocks 11. Non-contractible friction elements 12 preferably bridge the gap between the follower plates and desirably extend into the pockets thereof, the floating wedge blocks 11 being interposed between the elements 12 and the floating blocks 9—10, the elements 11 being adapted for a direct friction contact with the elements 12. The floating blocks 9—10 are in engagement with the springs 13 that desirably are continuous from block 9 to block 10. The follower plates are adapted to move longitudinally of the draft sills and are supported thereby in any convenient way. The opposed faces of the friction elements 12 are made concave so as snugly to surround the spring mechanism 13 while at the same time sufficient friction surfaces are provided at the ends of the elements or blocks 12 which are inclined to correspond in direction to the contiguous faces of the blocks 11. The springs 13 are prevented from bulging out of line by means of the closely surrounding opposed concave faces of the blocks 12. The friction devices 9, 10 between which the spring 13 is inclosed, taper toward the contiguous portions of the coupler. This feature is of particular importance where the springs extend in continuous lengths from block 9 to block 10. This feature of the construction is illustrated most clearly in Fig. 4.

The operation of the draft gear illustrated will now be described.

A push upon the coupler causes the pocketed follower plate 7 to move toward the rear while a pull upon the coupler causes the pocketed follower plate 8 to move toward the front, as will be apparent. In order that the spring mechanism may yield to slight thrusts of the coupler without operating the friction blocks, the blocks 11 are normally loose with respect to the blocks 9—10—12, as indicated by the slight clearance shown, while the blocks 9—10 normally engage the vertical end walls of the pockets of the follower plates. A material thrust of the coupler, however, will force the plate 7 or the plate 8 in the directions mentioned a sufficient distance to bring the lateral friction elements 12 into engagement with the blocks 11 and force these blocks 11 against the blocks 9—10, which latter two blocks, in turn, are forced toward the center of the friction gear by the blocks 11 and against the force of the spring mechanism 13. Whenever either follower plate 7 or 8 is thus sufficiently moved, it is apparent that both blocks 9—10 are removed from engagement with the vertical end walls of the pockets toward the center of the friction gear, whereby an increased compression of the spring mechanism is secured for a given movement of the coupler, making the friction gear much more responsive to coupler thrusts. There is sufficient clearance in the pockets of the follower plates to conveniently permit of the proper operation of the friction members therein.

In the preferred form of the invention there is thus provided a structure which may be described as a friction draft gear including two friction mechanisms, the elements 9—11—11 at one end and the elements 10—11—11 at the other end, a friction producing device composed of the elements 12—12, preferably in distinct pieces and moved by the coupler when said coupler operates in either direction to effect the substantially simultaneous operation of the said friction mechanisms, and spring mechanism interposed between the friction mechanisms. The spring mechanism is disposed longitudinally of the coupler and the friction mechanisms are moved bodily longitudinally of the coupler.

It is obvious that many changes may be made in the preferred embodiment of my invention without departing from the spirit of the invention, and I do not, therefore, wish to be limited to the precise construction shown, but,

Having thus described my invention, I claim as new and desire to secure by Letters-Patent:—

1. A friction draft gear including a coupler, pocketed follower plates operated by the coupler, centrally disposed friction blocks 9, 10 in the pockets of the follower plates, friction blocks 11 flanking each of said centrally disposed friction blocks, a friction producing device 12 extending between the follower plates and into the pockets thereof and adapted for substantially simultaneous engagement with the friction mechanisms, and spring mechanism interposed between the said centrally disposed friction blocks, said device 12 being formed in separated sections, the opposed faces of the sections being made concave to house the spring mechanism.

2. A friction draft gear including a coupler provided with a yoke, pocketed follower plates, friction mechanisms carried thereby, spring mechanism substantially extending across the space between the longitudinal sides of the yoke, and side friction elements 12, 12 constituting non-contractible friction mechanisms and having their inner opposed faces made concave to receive the spring mechanism which is disposed between said side friction elements.

3. A friction draft gear including a coupler provided with a yoke, pocketed follower plates, friction mechanisms carried thereby, spring mechanism substantially extending across the space between the longitudinal sides of the yoke, and side friction elements 12, 12 constituting non-contractible friction mechanisms and extending into the pocketed follower plates and engaging the friction mechanisms carried by the said follower plates, the spring mechanism being disposed between said side friction elements.

In witness whereof, I hereunto subscribe my name this 22nd day of April A. D., 1905.

JAMES R. CARDWELL.

Witnesses:
  G. L. CRAGG,
  CHAS. F. BASSETT.